(12) United States Patent
Kimberlin et al.

(10) Patent No.: US 9,411,907 B2
(45) Date of Patent: Aug. 9, 2016

(54) METHOD AND SYSTEM FOR PERFORMING SEARCHES IN A MULTI-TENANT DATABASE ENVIRONMENT

(75) Inventors: Susan Kimberlin, San Francisco, CA (US); Yurika Sebata-Dempster, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 83 days.

(21) Appl. No.: 12/980,061

(22) Filed: Dec. 28, 2010

(65) Prior Publication Data

US 2011/0264681 A1    Oct. 27, 2011

Related U.S. Application Data

(60) Provisional application No. 61/328,030, filed on Apr. 26, 2010.

(51) Int. Cl.
    *G06F 17/30*    (2006.01)

(52) U.S. Cl.
    CPC .................... *G06F 17/30976* (2013.01)

(58) Field of Classification Search
    CPC .......... G06F 17/30395; G06F 17/3064; G06F 17/30646
    USPC ........................... 707/727, 732, 767
    See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Khanh Pham
(74) *Attorney, Agent, or Firm* — Blakely, Sokoloff, Taylor & Zafman

(57) ABSTRACT

Techniques for searching in a multitenant database environment. A graphical user interface is provided that includes a search functionality for searching a database within a multitenant database environment. The multitenant environment includes data for multiple client entities, each identified by a tenant identifier (ID) having one of one or more associated users. Users of the client identities can only access data identified by their tenant ID. The multitenant environment is at least a hosted database provided by an entity separate from the client entities, and provides on-demand database service to the client entities. Suggested search results are provided in response to user-generated search query input. The suggested search results are based on monitored usage patterns corresponding to a user and are refined in response to subsequent user-generated search query input. Search results are provided based on the user-generated search query input and/or a user selection from the suggested search results.

14 Claims, 11 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,487,145 B1 * | 2/2009 | Gibbs et al. ............ 707/999.004 |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0043750 A1 * | 2/2007 | Dingle ........................ 707/101 |
| 2007/0061317 A1 * | 3/2007 | Ramer et al. .................. 707/4 |
| 2007/0130130 A1 * | 6/2007 | Chan et al. .................... 707/3 |
| 2007/0130137 A1 * | 6/2007 | Oliver et al. .................. 707/5 |
| 2008/0086735 A1 * | 4/2008 | Cheenath et al. ............ 719/313 |
| 2008/0109401 A1 * | 5/2008 | Sareen et al. ................... 707/3 |
| 2010/0082604 A1 * | 4/2010 | Gutt et al. .................... 707/721 |
| 2012/0296934 A1 * | 11/2012 | Carpenter et al. ............ 707/769 |

\* cited by examiner

Search Results

Accounts [1]
Leads [3]

| Acme | | Search |
|---|---|---|
| Selected Options: Accounts, Contacts, Leads, North America | | Search Options |

420

Accounts [1]   Show Filters

| Action | Account Name | | Phone |
|---|---|---|---|
| Edit | Acme | | (212) 555-5555 |

Leads [3]   Show Filters

| Action | Name | Title | Phone | Company | Email | Le U |
|---|---|---|---|---|---|---|
| Edit | James Johnson | | | Acme | | |

FIG. 4B

Search Options                                                    [X]

acme

Scope                                                  | selected | Clear Selections ☐ All
☑ Accounts          ☐ Invoices            ☐ Tracks
☐ Account Feature Comm...  ☐ IP Licenses    ☐ Transactions
☐ Assets            ☐ Leads               ☐ Trends
☐ Attachments       ☐ Licenses            ☐ Users
☐ Business Issues   ☐ Marketing Requests  ☐ Venues
☐ Campaigns         ☐ Notes               ☐ Vendors
☐ Cases             ☐ Open Issues         ☐ Vendor Invoices
☐ Contacts          ☐ Opportunities       ☐ Volunteering

More Options                                  Division [ North America ▶ ]

☐ Limit to items I own
☐ Exact phrase

☐ Make these my default search settings

[ Search ]   [ Close ]

Subject                        Name              Related To
Send Email                     Leanne Tomlin     Acme - 1,200 Widgets

METHOD AND SYSTEM FOR PERFORMING SEARCHES IN A MULTI-TENANT DATABASE ENVIRONMENT

CLAIM OF PRIORITY

This application claims the benefit of U.S. Provisional Patent Application 61/328,030 entitled METHOD AND SYSTEM FOR PERFORMING SEARCHES IN A MULTI-TENANT DATABASE ENVIRONMENT, by Susan Kimberlin, et al., filed Apr. 26, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Embodiments of the invention generally to search techniques in database systems. More particularly, embodiments of the invention are related to search techniques in a multi-tenant database system.

BACKGROUND

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. As database systems become more complex, techniques and strategies for providing effective search mechanisms also becomes more complex.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 4b illustrates one embodiment of a graphical illustration of a search results interface that provides an auto-complete functionality and search option/scope link.

FIG. 5 illustrates one embodiment of a graphical interface that may be utilized to define the scope of a search.

FIG. 6 illustrates one embodiment of a graphical interface providing search results.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

In the description that follows, various techniques will be provided that support integrated search techniques for tenants of a multi-tenant database. It is useful to provide infrastructure and tools for integrated search to allow a user of a multi-tenant database to search multiple types of data with a single query rather than multiple queries to multiple data sets.

One or more of the following features may be provided in the integrated search mechanism described herein. A lookup auto-complete for the search field may be utilized. In one embodiment, the auto-complete is applied to a single object and does not include recent searches. In alternate embodiments, the auto-complete may be applied to multiple objects and/or may include recent searches. Auto-complete refers to providing one or more suggested search criteria by automatically completing a search query based on the partial search query entered. Search results may include results from social networking/organizational sources as well as databases. Search results may also include parent-child relationships to provide additional contextual information to the user.

Figure 1:
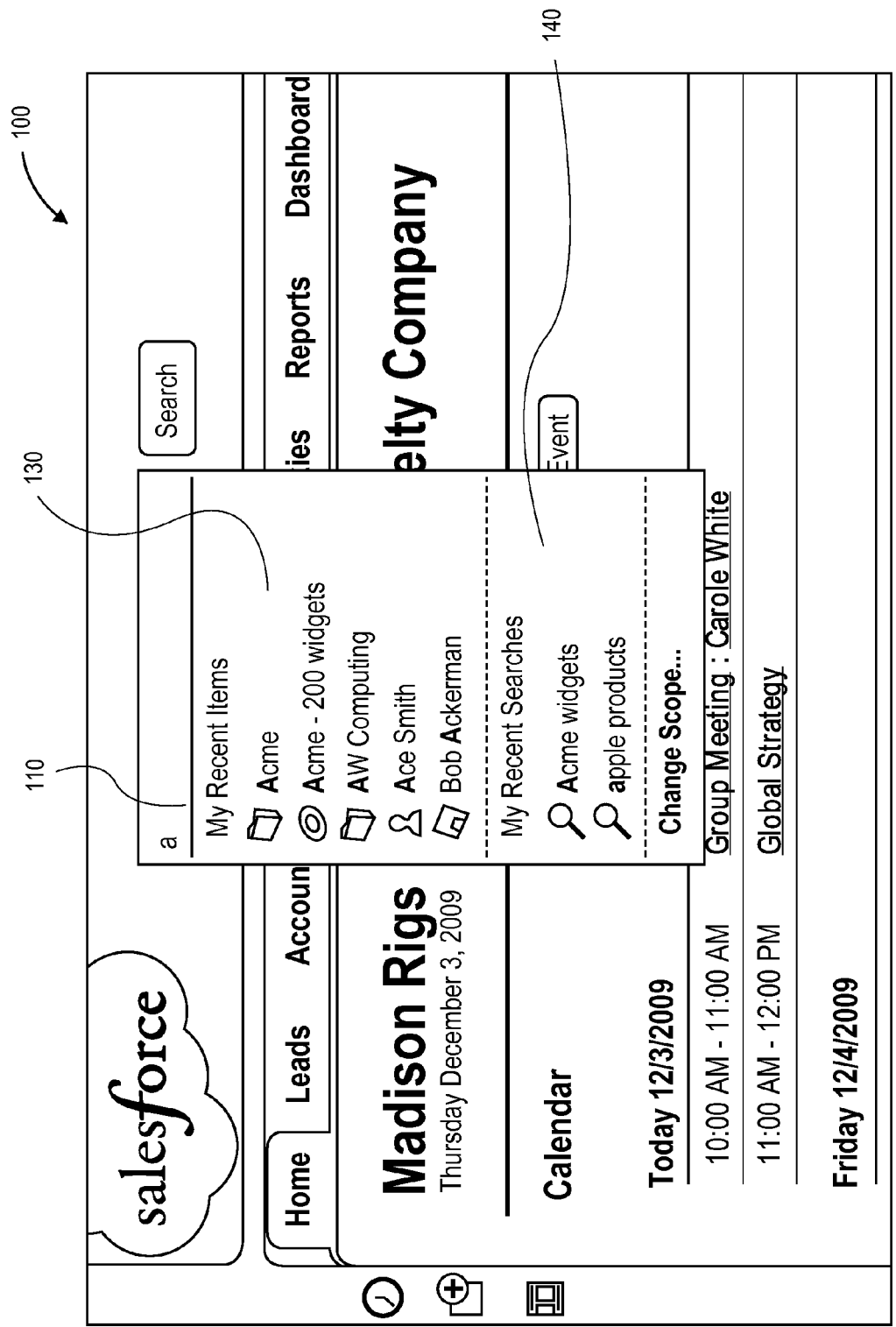
FIG. 1 illustrates one embodiment of a graphical illustration of a search interface that provides an auto-complete functionality.

FIG. 1 illustrates one embodiment of a graphical illustration of a search interface that provides an auto-complete functionality. In one embodiment, when a user begins to type a search query into dialog box 110, user interface 100 provides a drop down (or pop up) menu providing suggested auto-completions based on recent items accessed by the user, 130, and/or recent searches by the user, 140. In one embodiment, the drop down menu provides an option to define (or refine) the scope of the search.

In one embodiment, a cache is maintained of up to 100 records per object type (i.e. up to 100 accounts, up to 100 contacts, up to 100 custom object records for each custom object, etc.) for each user in their Most Recently Used (MRU) list. When the user searches, this list may be used as the basis for auto-complete to show the user records they have recently viewed, edited, or looked up so that the user can short-cut to that record by selecting a record from the list. In alternate embodiments, different cache sizes may be maintained (e.g., 50 records per object type, 100 total records, 250 records per object type).

In one embodiment, auto-complete fills in results that match the string that a user has typed as the user is typing. Auto-complete, in one embodiment, uses both a user's recent items, which are records that they have recently viewed, edited or looked up and associated to a record, and a user's recent searches, which are the search terms the user has executed searches on.

Auto-complete on recent items affords the user the opportunity to quickly access records that are in regular use quickly, bypassing search and taking the user straight to the detail page for a record if they select it from the auto-complete drop down. This brings context to the search function because the behavior is based on user history. In one embodiment, as the user types, the list is progressively refined to match the string the user has typed.

Figure 2:
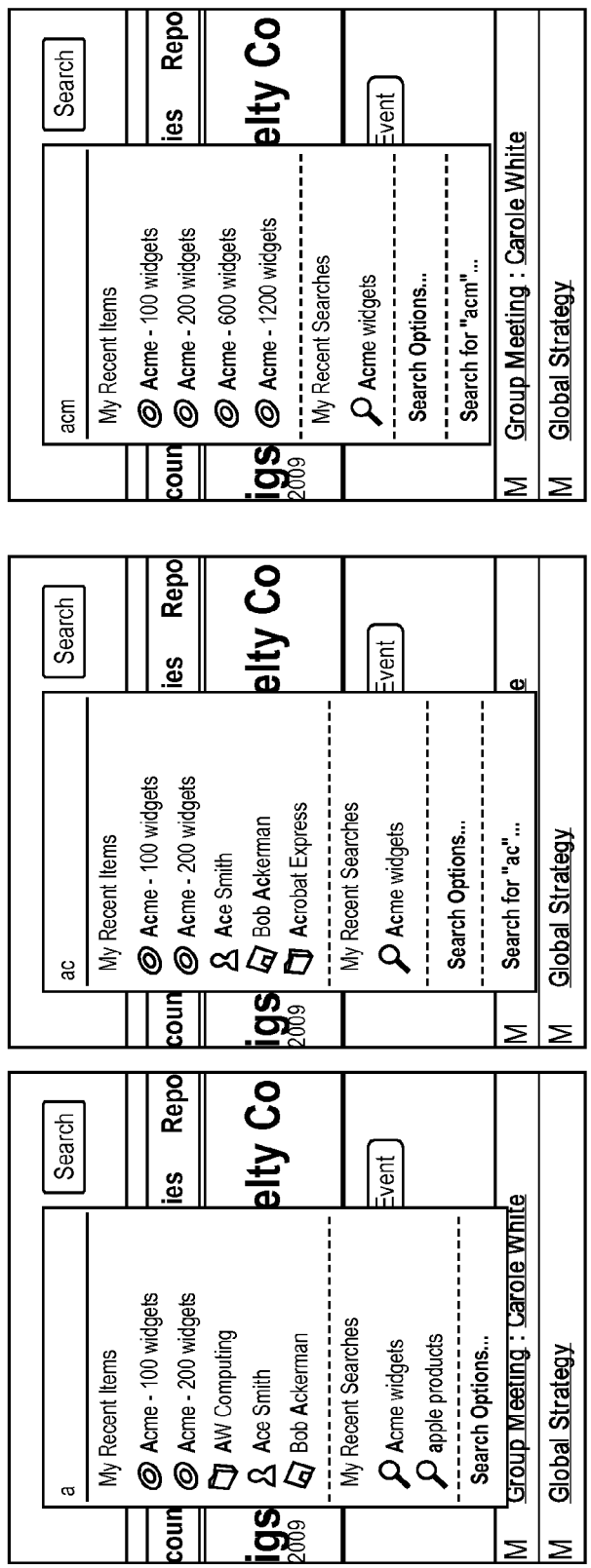
FIGS. 2a-2c illustrate one embodiment of a graphical illustration of a search interface that provides progressive refinement as part of an auto-complete functionality.

FIGS. 2a-2c illustrate one embodiment of a graphical illustration of a search interface that provides progressive refinement as part of an auto-complete functionality. FIG. 2a illustrates one embodiment of a graphical illustration of a search interface in response to a user beginning to type a search query. In the example of FIG. 2a, the user has typed an "a" character in the search dialog box. In response to the user typing an "a" the search interface provides all recent items and recent searches that begin with the letter "a" in the drop down menu.

FIG. 2b illustrates one embodiment of a graphical illustration of a search interface in response to a user continuing to type the search query from FIG. 2a. In the example of FIG. 2b, the user has typed "ac" in the search dialog box. In response to the user typing "ac" the search interface provides all recent items and recent searches that begin with "ac" in the drop down menu. Thus, the options provided by the drop down menu are refined as the user continues to type the search query.

FIG. 2c illustrates one embodiment of a graphical illustration of a search interface in response to a user continuing to type the search query from FIG. 2b. In the example of FIG. 2c, the user has typed "acm" in the search dialog box. In response to the user typing "acm" the search interface provides all recent items and recent searches that begin with "acm" in the drop down menu. Thus, the options provided by the drop down menu are further refined as the user continues to type the search query.

Figure 3:
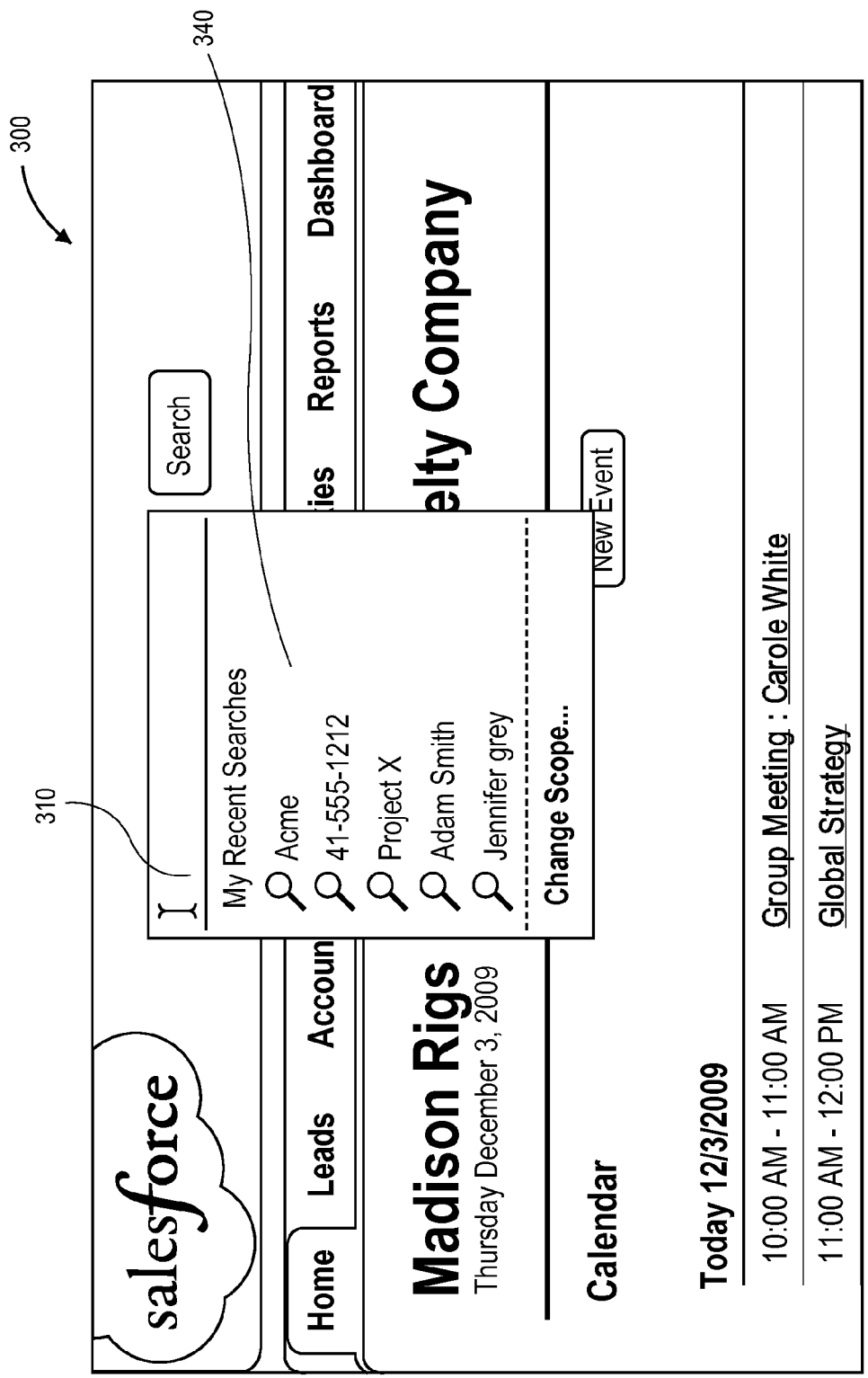
FIG. 3 illustrates one embodiment of a graphical illustration of a search interface that provides an auto-complete functionality based on recently performed searches.

FIG. 3 illustrates one embodiment of a graphical illustration of a search interface that provides an auto-complete functionality based on recently performed searches. In one embodiment, a cache or other listing of searches that the user has performed is maintained so that the user can easily access these searches to run them again. In one embodiment, when a user begins to type a search query into dialog box 310, user interface 300 provides a drop down (or pop up) menu providing suggested auto-completions based on recent searches by the user, 340. In one embodiment, the drop down menu provides an option to define (or refine) the scope of the search.

Figure 4A:
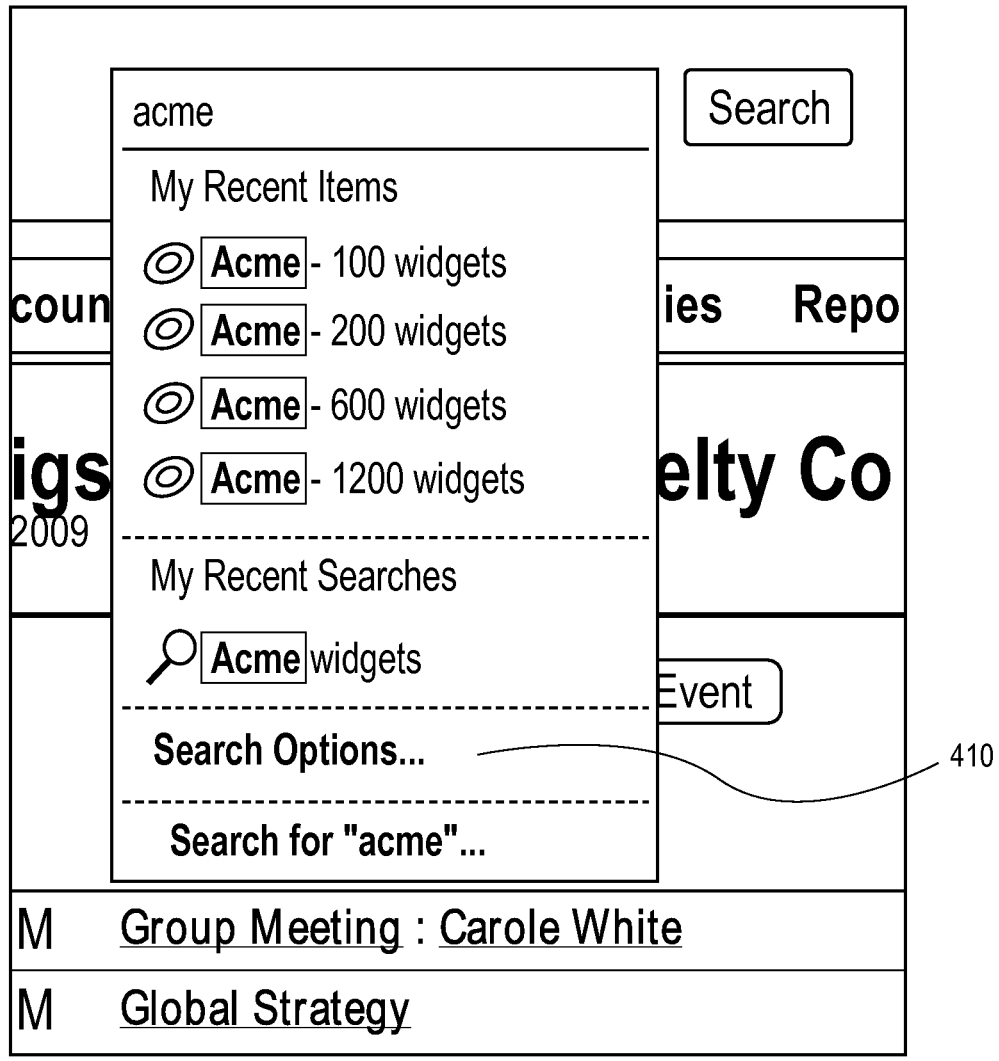
FIG. 4a illustrates one embodiment of a graphical illustration of a search interface that provides an auto-complete functionality and search option/scope link within a drop down menu.

FIG. 4a illustrates one embodiment of a graphical illustration of a search interface that provides an auto-complete functionality and search option/scope link within a drop down menu. In one embodiment, the default search scope is to search all searchable fields and objects for the term(s) provided by the user in the search dialog box. One embodiment of an interface for selecting a search scope (labeled "search options" 410 in FIG. 4a) is described below with respect to FIG. 5.

FIG. 4b illustrates one embodiment of a graphical illustration of a search results interface that provides an auto-complete functionality and search option/scope link. In one embodiment, the default search scope is to search all searchable fields and objects for the term(s) provided by the user in the search dialog box (labeled "search options" 420 in FIG. 4b). One embodiment of an interface for selecting a search scope is described below with respect to FIG. 5.

FIG. 5 illustrates one embodiment of a graphical interface that may be utilized to define the scope of a search. The example of FIG. 5 provides various categories that may be useful in a business-oriented multi-tenant database environment. In other environments, other categories may be utilized.

For some users, for example, those with specific workflows associated with their roles, such as customer support agents need to search a specific subset of objects as they perform the tasks in their workflow. In one embodiment, for these users, searching all data available to them will return results that they do not need to see to find the data they are looking for. Unneeded results reduce the scannability of the results, reducing the utility of search functionality. In one embodiment, there is also the ability to save a different scope to be their default each time they search from the header.

Figure 6:
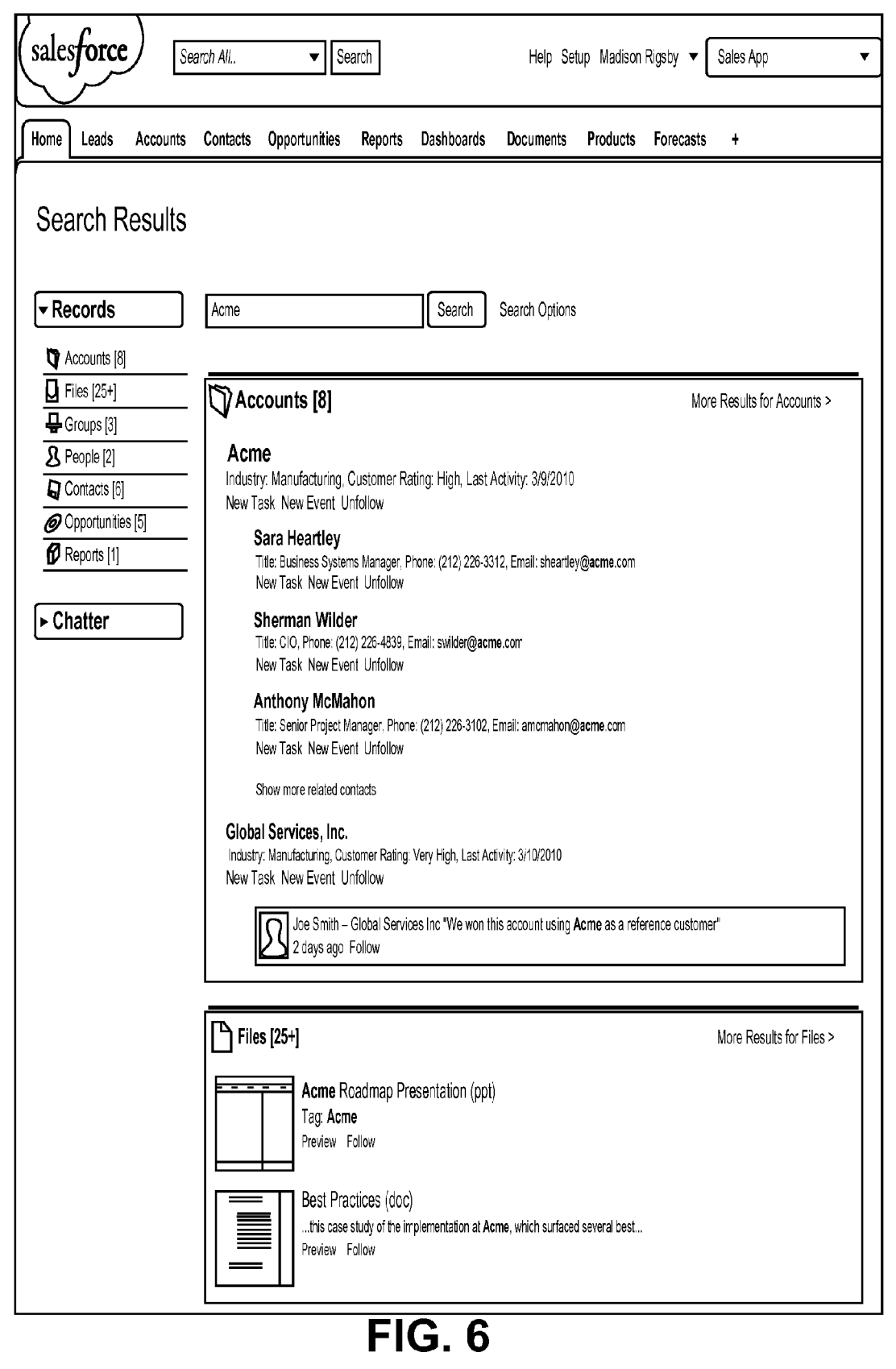

FIG. 6 illustrates one embodiment of a graphical interface providing search results. In one embodiment, search results are provided in a categorized manner with a parent-child relationship structure. In one embodiment, search results are provided with links to the categories so that a user may jump to a selected category.

Figure 7:
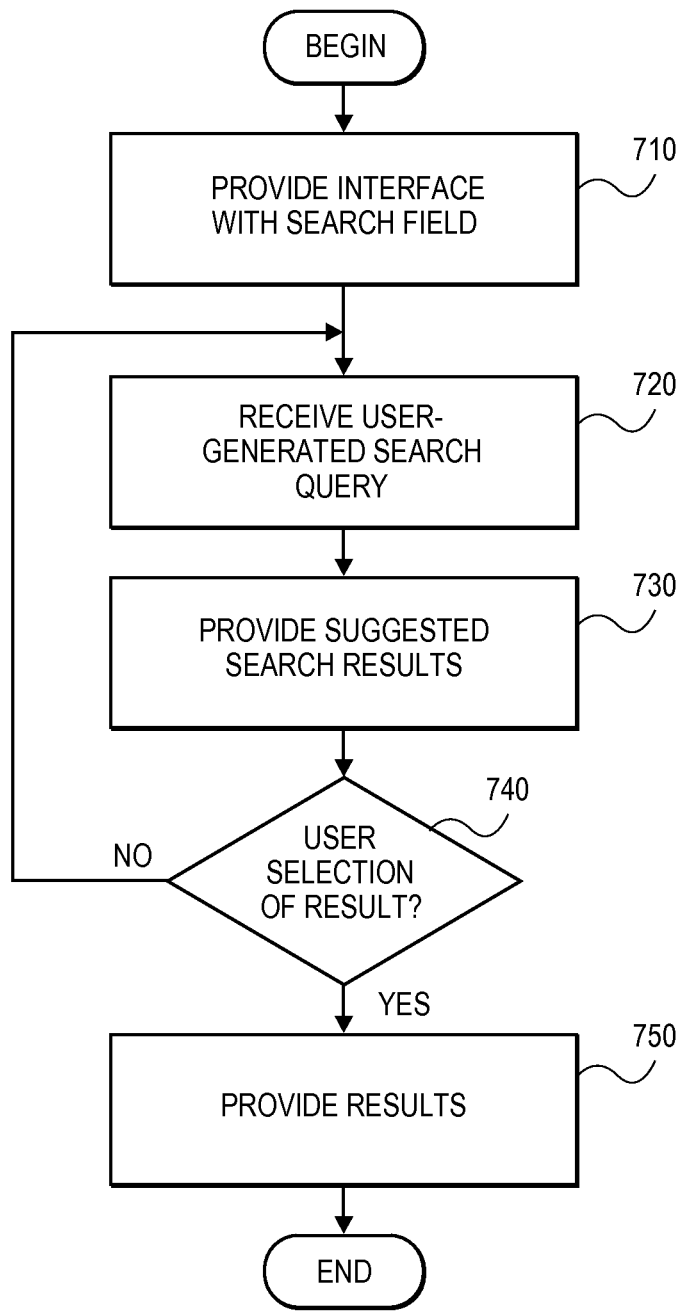
FIG. 7 is a flow diagram of one embodiment of a technique for providing search results in a multitenant database environment.

FIG. 7 is a flow diagram of one embodiment of a technique for providing search results in a multitenant database environment. The search functionality described with respect to FIG. 7 may be provided by any of the user interfaces described above as well as other user interfaces that provide search functionality.

In one embodiment, the graphical user interface search functionality may allow the user to search one or more feeds in addition to files within the multitenant database. Feeds are real-time updates, or other types of information provided by users of the multitenant environment. These updates may not be limited to form or time as may occur with database files. That is, users have more flexibility to provide status or other information in their feeds. In one embodiment, the search functionality described herein provides a unified mechanism to search both database data and feeds for one or more users of a multitenant database.

The multitenant environment provides a graphical user interface that includes at least one search field, 710. This interface can take many forms and provide various types of information in addition to providing the search field(s).

A user of the graphical interface may select the search field, for example, by clicking on it with a mouse or otherwise interacting with the interface to select the search functionality. The user may then provide a search query by, for example, typing one or more characters into the search field, 720. In response to the user-provided search query information, the multitenant environment search engine can provide suggested search results based on the portion of the search query that has been entered, 730.

In one embodiment, suggested search results may be provided after a single character has been entered, as described above. In one embodiment, one or more lists are maintained for each user indicating the most recent records of various types accessed by that user. Records types may vary by the type of data stored in the database being searched. In one embodiment, a list of a pre-selected number (e.g., 100, 50, 1,000) of the most recently accessed files of various types is maintained for the user. The suggested search results come from this list.

In one embodiment, the suggested search results are provided as a pop-down or pop-up menu that allows the user to select one of the suggested search results. In one embodiment, selection of a suggested search result takes the user directly to the file indicated by the suggested search result without performing the search and presenting the search results.

In one embodiment, a list of previous searches performed by the user is maintained. In addition to (or instead of) the suggested search results described above, the user may be presented with one or more suggested searches. In response to the user selecting one of the suggested searches, the multitenant database search engine may perform the search without requiring the user to manually enter the complete search query in the search field. Thus, the suggested search results can be in the form of suggested files previously accessed and/or suggested search queries to be performed.

In one embodiment, for each character of the search query received, 720, the suggested search results are provided, 730. Thus, if the user has not completed entering the search query, 740, as indicated, for example, by selecting "search" or one of the selected search results, the multitenant search engine may continue to receive user-generated input and refine the suggested search results. As illustrated above, with respect to FIGS. 2a through 2c, for example, the suggested search results may be refined as the user continues to enter the query.

When the user has finished entering the search query, 740, as indicated by, for example, selecting one of the suggested search results or selecting the "search" option on the interface, the multitenant search engine may provide the search results, 750. The search results may be provided as described above. In one embodiment, search results are grouped by file type. In one embodiment, the result user interface may provide links to various portions of the search results, for example, separated by file type. In one embodiment, the search results may include feeds as well as file types.

Figure 8:
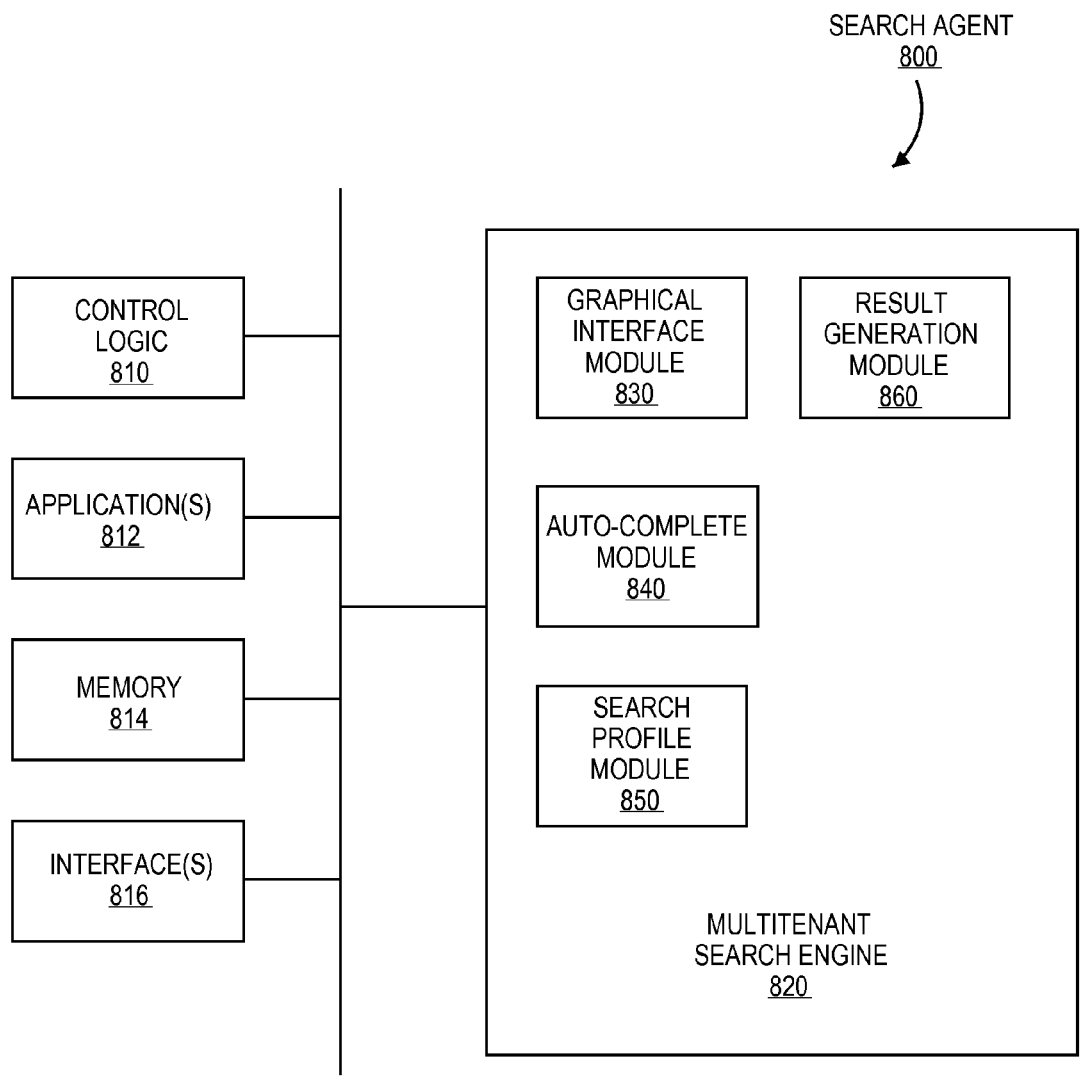
FIG. 8 is a block diagram of one embodiment of a search agent that may be utilized in a multitenant database environment.

FIG. 8 is a block diagram of one embodiment of a search agent that may be utilized in a multitenant database environment. Search agent 800 includes control logic 810, which implements logical functional control to direct operation of search agent 800, and/or hardware associated with directing operation of search agent 800. Logic may be hardware logic circuits and/or software routines. In one embodiment, search agent 800 includes one or more applications 812, which represent code sequence and/or programs that provide instructions to control logic 810.

Search agent 800 includes memory 814, which represents a memory device and/or access to a memory resource for storing data and/or instructions. Memory 814 may include memory local to search agent 800, as well as, or alternatively, including memory of the host system on which search agent 800 resides. Search agent 800 also includes one or more interfaces 816, which represent access interfaces to/from (an input/output interface) search agent 800 with regard to entities (electronic or human) external to search agent 800.

Search agent 800 also includes multitenant search engine 820, which represents one or more functions or modules that enable search agent 800 to provide the search services as described above. The example of FIG. 8 provides several modules that may be included in multitenant search engine 820; however, different and/or additional modules may also be included. Example modules that may be involved in providing the search functionality include graphical interface module 830, auto-complete module 840, search profile module 850 and result generation module 860. Each of these modules may further include other sub-modules to provide other functions. As used herein, a module refers to routine, a subsystem, logic circuit, microcode, etc., whether implemented in hardware, software, firmware or some combination thereof.

Graphical interface module 830 provides one or more components of a graphical user interface a user experiences with performing searches in a multitenant database environment. Graphical interface module 830 may provide at least one field configured to receive user-generated input indicating a search query to be performed. The search query may be defined, for example, by alphanumeric characters or other indications of characteristics of files to be retrieved as a result of the search.

Auto-complete module 840 operates as described above to provide suggested searches based on user-generated input received via graphical interface module 830. Auto-complete module may provide suggested searches and/or suggested search results based on previous interactions with the user providing the search query.

Search profile module 850 maintains information related to a user that may be used by auto-complete module 840 to generate suggested searches and/or suggested search results. In one embodiment, search profile module 850 maintains at least a list of most recently accessed records of varying types. For example, search profile module 850 may maintain a list of the 100 (or any other number) most recently accessed files of one or more types within the multitenant database. A subset of these files may be provided as suggested searches and/or search results in response to user-generated query information provided to graphical interface module 830.

Result generation module 860 may provide suggested searches, suggested search results and/or actual search results via graphical user interface. As described above, a user may select a suggested search result (e.g., a link to a particular file), a suggested search to be performed, or an actual search query provided by the user. As the result of the user's selection, links to one or more files may be provided and/or search results may be provided to the user by result generation module 860.

Figure 9:
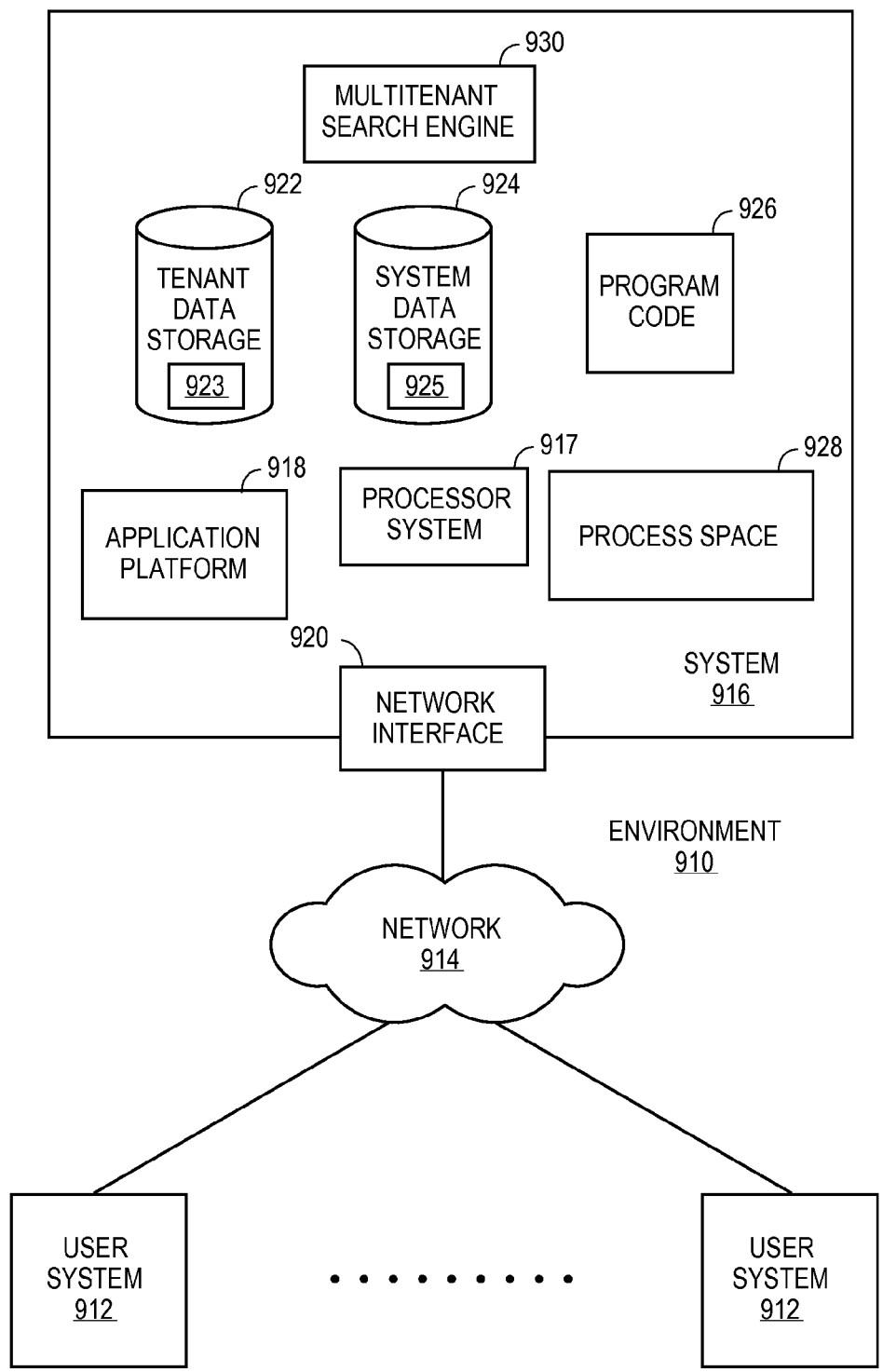
FIG. 9 is a block diagram of one embodiment of a multi-tenant environment.

FIG. 9 illustrates a block diagram of an environment 910 wherein an on-demand, multitenant database service might be used. Environment 910 may include user systems 912, network 914, system 916, processor system 917, application platform 918, network interface 920, tenant data storage 922, system data storage 924, program code 926, and process space 928. In one embodiment, multitenant environment 910 may include multitenant search engine 930 that may operate as described herein. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein.

A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, web pages and other information to and from user systems 912 and to store to, and retrieve from, a database system related data, objects, and web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 16 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
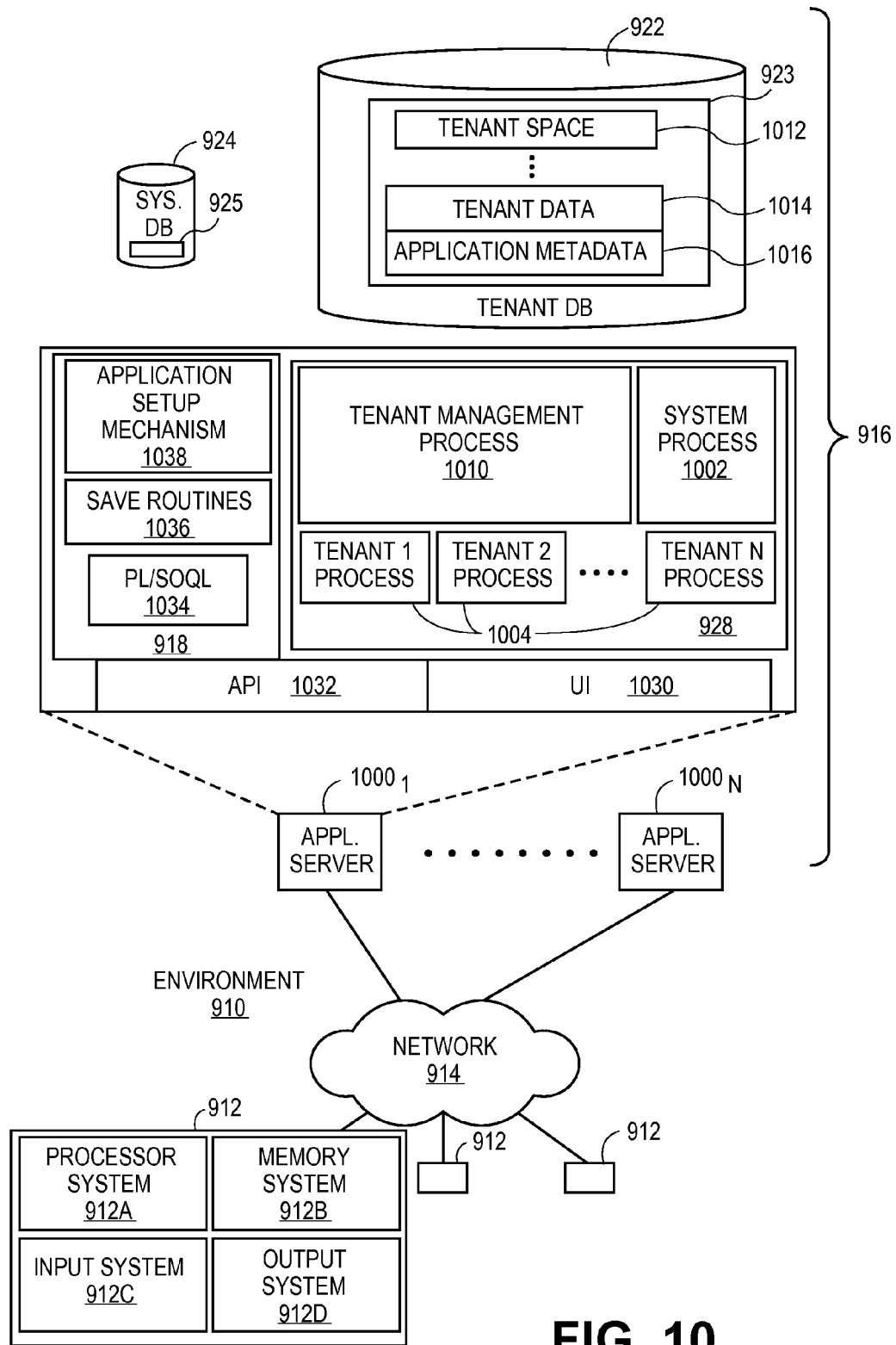
FIG. 10 is a block diagram of one embodiment of a multi-tenant environment.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916.

FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 6. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924.

Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014.

Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032.

A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000.

Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for performing a search operation in a multi-tenant database environment, the method comprising:
providing a graphical user interface on a display of an electronic computing device, wherein the graphical user interface includes a search functionality for searching a database within a multitenant database environment, wherein
the multitenant environment includes data for multiple client entities, each identified by a tenant identifier (ID) having one of one or more users associated with the tenant ID,
users of each of multiple client identities can only access data identified by a tenant ID associated with the respective client entity, and
the multitenant environment is at least a hosted database provided by an entity separate from the client entities, and provides on-demand database service to the client entities;
maintaining, for a plurality of users corresponding to one or more tenants of the multitenant environment, a list of most recently used records for a plurality of database object types;
providing suggested search results via the graphical user interface in response to a user-generated partial search query input by performing one or more anticipated searches based on the user-generated partial search query, wherein the suggested search results are derived from database objects that match the user-generated partial search query input and include database records of multiple object types that have been recently edited by a user generating the user-generated partial search query input by utilizing the list of most recently used records corresponding to the user, the suggested search results being grouped by database object type, and further wherein the suggested search results also include content from one or more real-time feeds comprising at least one social media feed within the multitenant environment of at least one other user from the same client entity as the user;

refining the suggested search results in response to subsequent user-generated search query input by performing one or more subsequent anticipated searches based on the subsequent user-generated search query input, the refined suggested search results also based on multiple object types that have been recently edited by a user generating the subsequent user-generated search query input by utilizing the list of most recently used records corresponding to the user, the suggested search results being grouped by database object type, and further wherein the suggested search results also include content from one or more real-time feeds comprising at least one social media feed within the multitenant environment of at least one other user from the same client entity as the user; and providing search results in the graphical user interface based on the user-generated search query input and/or a user selection from the suggested search results.

2. The method of claim 1 wherein the user is identified by a session cookie.

3. The method of claim 1 wherein the user is identified by at least a username and password combination.

4. The method of claim 1 further comprising:
providing additional suggested search results in response to user-generated search query input based on previous searches corresponding to a user;
refining the additional suggested search results in response to subsequent user-generated search query input; and
providing search results in the graphical user interface based on the user-generated search query input and/or a user selection from the suggested search results.

5. The method of claim 4 wherein the previous searches comprise most recently performed searches by the user corresponding to one or more record types.

6. The method of claim 1 wherein the search results are grouped by object type.

7. The method of claim 1 wherein the suggested search results comprise links to objects so that selection of a suggested search result avoids performing the corresponding search.

8. An article of manufacture comprising a computer readable non-transitory medium, having stored thereon instructions to cause one or more processors to perform a search operation in a multitenant database environment, the instructions comprising instructions that, when executed, cause the one or more processors to:

provide a graphical user interface on a display of an electronic computing device, wherein the graphical user interface includes a search functionality for searching a database within a multitenant database environment, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities;

maintain, for a plurality of users corresponding to one or more tenants of the multitenant environment, a list of most recently used records for a plurality of database object types;

provide suggested search results via the graphical user interface in response to a user-generated partial search query input by performing one or more anticipated searches based on the user-generated partial search query, wherein the suggested search results are derived from database objects that match the user-generated partial search query input and include database records of multiple object types that have been recently edited by a user generating the user-generated partial search query input by utilizing the list of most recently used records corresponding to the user, the suggested search results being grouped by database object type, and further wherein the suggested search results also include content from one or more real-time feeds comprising at least one social media feed within the multitenant environment of at least one other user from the same client entity as the user;

refine the suggested search results in response to subsequent user-generated search query input by performing one or more subsequent anticipated searches based on the subsequent user-generated search query input, the refined suggested search results also based on multiple object types that have been recently edited by a user generating the subsequent user-generated search query input by utilizing the list of most recently used records corresponding to the user, the suggested search results being grouped by database object type, and further wherein the suggested search results also include content from one or more real-time feeds comprising at least one social media feed within the multitenant environment of at least one other user from the same client entity as the user; and provide search results in the graphical user interface based on the user-generated search query input and/or a user selection from the suggested search results.

9. The article of claim 8 wherein the user is identified by a session cookie.

10. The article of claim 8 wherein the user is identified by at least a username and password combination.

11. The article of claim 8 further comprising instructions that, when executed, cause the one or more processors to:
provide additional suggested search results in response to user-generated search query input based on previous searches corresponding to a user;
refine the additional suggested search results in response to subsequent user-generated search query input; and
provide search results in the graphical user interface based on the user-generated search query input and/or a user selection from the suggested search results.

12. The article of claim 11 wherein the previous searches comprise most recently performed searches by the user corresponding to one or more record types.

13. The article of claim 8 wherein the search results are grouped by object type.

14. The article of claim 8 wherein the suggested search results comprise links to objects so that selection of a suggested search result avoids performing the corresponding search.

* * * * *